US012639685B2

(12) United States Patent
Crooks

(10) Patent No.: US 12,639,685 B2
(45) Date of Patent: May 26, 2026

(54) PRODUCE IDENTIFICATION, WEIGHT, AND CHECKOUT VERIFICATION PROCESSING

(71) Applicant: NCR Voyix Corporation, Atlanta, GA (US)

(72) Inventor: John Crooks, Duluth, GA (US)

(73) Assignee: NCR Voyix Corporation, Atlanta, GA (US)

( * ) Notice: Subject to any disclaimer, the term of this patent is extended or adjusted under 35 U.S.C. 154(b) by 266 days.

(21) Appl. No.: 17/515,940

(22) Filed: Nov. 1, 2021

(65) Prior Publication Data

US 2022/0051213 A1      Feb. 17, 2022

Related U.S. Application Data

(63) Continuation of application No. 16/586,320, filed on Sep. 27, 2019, now Pat. No. 11,176,529.

(51) Int. Cl.
G06Q 20/18          (2012.01)
G01G 19/414         (2006.01)
          (Continued)

(52) U.S. Cl.
CPC ......... G06Q 20/18 (2013.01); G01G 19/4144 (2013.01); G06Q 20/208 (2013.01);
          (Continued)

(58) Field of Classification Search
CPC .... G06Q 20/18; G06Q 20/208; G06Q 20/322; G06Q 20/4016; G06Q 30/0283; G06Q 30/0633; G06Q 30/0238; G06Q 30/0268;

G06Q 30/02; G06Q 30/0623; G06Q 10/087; G06Q 30/0631; G06Q 10/08; G06Q 30/0635; G06Q 20/204; G06Q 20/203;
          (Continued)

(56) References Cited

U.S. PATENT DOCUMENTS

| | | | |
|---|---|---|---|
| 10,318,576 B2 * | 6/2019 | Jaber | ..................... G06F 16/583 |
| 2014/0001266 A1 * | 1/2014 | Collins, Jr. | ........ G06K 7/10861 235/462.13 |

(Continued)

OTHER PUBLICATIONS

Duan, G., Yang, J., & Yang, Y. (2011). Content-Based Image Retrieval Research, 22, 471â477. https://doi.org/10.1016/j.phpro.2011.11.073. (Year: 2011).*

*Primary Examiner* — Avia Salman
(74) *Attorney, Agent, or Firm* — Schwegman Lundberg & Woessner, P.A.

(57)          ABSTRACT

Produce items are identified in aisle of a store during a self-shopping session of a shopper and the produce items are associated with a shopping cart of the shopper. A weigh terminal permits produce items to be placed on a weigh plate for weighing in any order selected by the shopper. Each produce item is verified, weight recorded, and price noted in the shopping cart. Discrepancies in produce identification are addressed on checkout and payment for the shopping cart. In an embodiment, aging produce items are identified in aisle or at the weigh terminal, and the shopper is provided a discounted price on such produce items; or availability of aging produce items are communicated to the shopper in aisle during produce identification or at the weigh terminal during produce verification.

4 Claims, 4 Drawing Sheets

(51) Int. Cl.

| | |
|---|---|
| *G06Q 20/20* | (2012.01) |
| *G06Q 20/32* | (2012.01) |
| *G06Q 20/40* | (2012.01) |
| *G06Q 30/0283* | (2023.01) |
| *G06Q 30/0601* | (2023.01) |

(52) U.S. Cl.
CPC ....... *G06Q 20/322* (2013.01); *G06Q 20/4016* (2013.01); *G06Q 30/0283* (2013.01); *G06Q 30/0633* (2013.01)

(58) Field of Classification Search
CPC ........ G06Q 20/20; G06Q 30/06; G06Q 20/00; G06Q 30/0639; G06Q 30/01; G01G 19/4144; G01G 19/52; G07B 2017/00225; G07G 1/0009; G07G 1/14; G07G 1/0018; G07G 1/0045; G07G 1/0063; G07G 1/0072; G07G 1/01; G07G 1/12; G06V 20/52; G06V 10/764; G06V 20/10; G06V 20/20; G06V 2201/10; G06V 10/245; G06V 10/443; G06V 10/765; G06V 20/44; G06V 2201/09; G06V 40/103; G06V 40/172; G06V 40/20; G06T 11/001; G06T 11/60; G06T 2201/0065; G06F 18/00; G06F 3/147; H04L 63/0861; G06K 17/00; G06K 19/07767; G06K 7/0008; G06K 7/10079; G06K 7/10178; G06K 7/10316; G06K 7/10336; G06K 7/10346; G06K 7/10356
USPC .......................................................... 705/23
See application file for complete search history.

(56) References Cited

U.S. PATENT DOCUMENTS

| | | | | |
|---|---|---|---|---|
| 2017/0206517 A1* | 7/2017 | Kwan | ................. | G06K 7/1473 |
| 2019/0197560 A1* | 6/2019 | Migdal | ............... | G06Q 30/018 |
| 2019/0333039 A1* | 10/2019 | Glaser | ................. | G06Q 20/202 |
| 2021/0004550 A9* | 1/2021 | Macintosh | ............ | G06Q 30/00 |

* cited by examiner

200

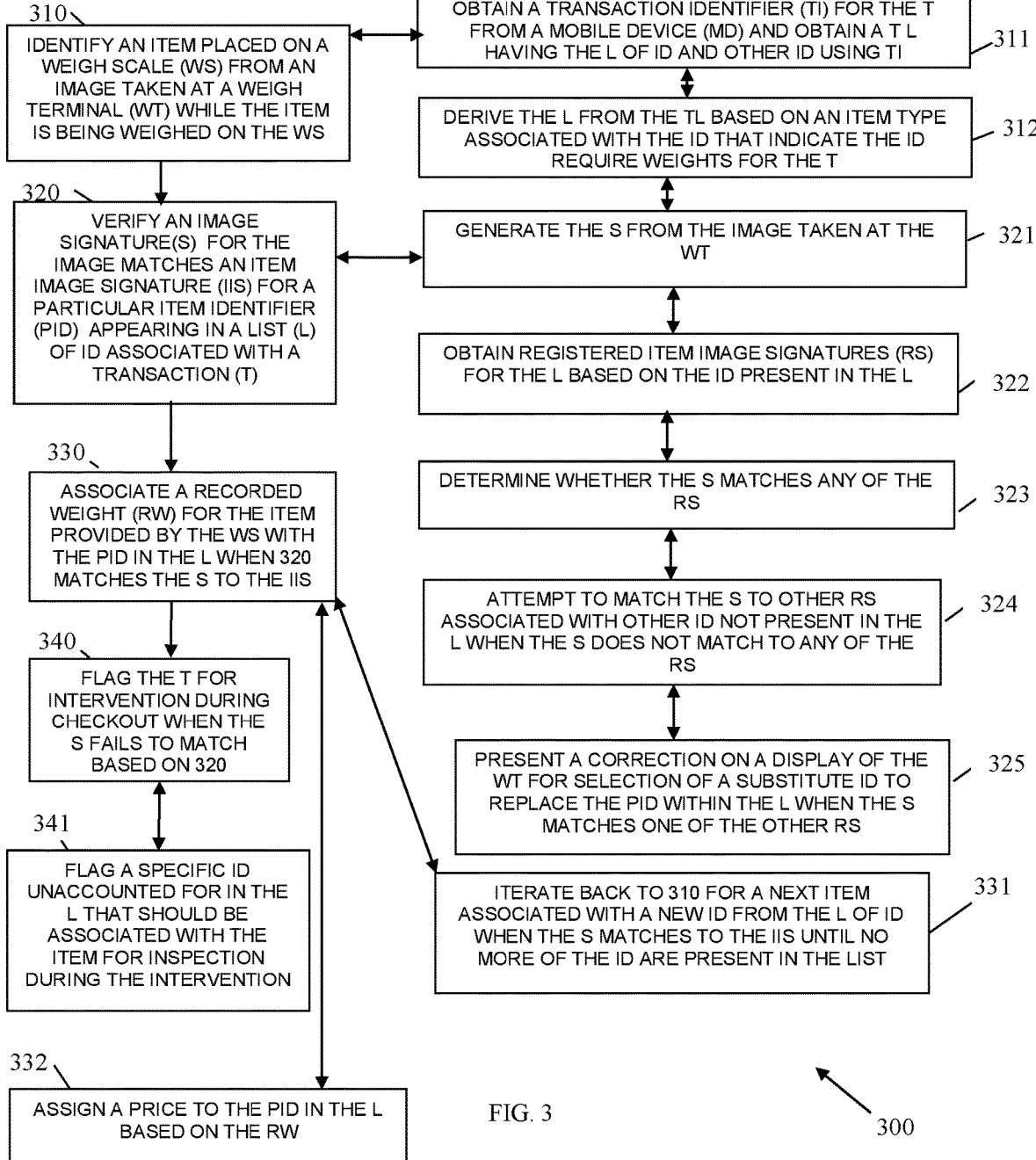

310 — IDENTIFY AN ITEM PLACED ON A WEIGH SCALE (WS) FROM AN IMAGE TAKEN AT A WEIGH TERMINAL (WT) WHILE THE ITEM IS BEING WEIGHED ON THE WS

311 — OBTAIN A TRANSACTION IDENTIFIER (TI) FOR THE T FROM A MOBILE DEVICE (MD) AND OBTAIN A T L HAVING THE L OF ID AND OTHER ID USING TI

312 — DERIVE THE L FROM THE TL BASED ON AN ITEM TYPE ASSOCIATED WITH THE ID THAT INDICATE THE ID REQUIRE WEIGHTS FOR THE T

320 — VERIFY AN IMAGE SIGNATURE(S) FOR THE IMAGE MATCHES AN ITEM IMAGE SIGNATURE (IIS) FOR A PARTICULAR ITEM IDENTIFIER (PID) APPEARING IN A LIST (L) OF ID ASSOCIATED WITH A TRANSACTION (T)

321 — GENERATE THE S FROM THE IMAGE TAKEN AT THE WT

322 — OBTAIN REGISTERED ITEM IMAGE SIGNATURES (RS) FOR THE L BASED ON THE ID PRESENT IN THE L

330 — ASSOCIATE A RECORDED WEIGHT (RW) FOR THE ITEM PROVIDED BY THE WS WITH THE PID IN THE L WHEN 320 MATCHES THE S TO THE IIS

323 — DETERMINE WHETHER THE S MATCHES ANY OF THE RS

340 — FLAG THE T FOR INTERVENTION DURING CHECKOUT WHEN THE S FAILS TO MATCH BASED ON 320

324 — ATTEMPT TO MATCH THE S TO OTHER RS ASSOCIATED WITH OTHER ID NOT PRESENT IN THE L WHEN THE S DOES NOT MATCH TO ANY OF THE RS

325 — PRESENT A CORRECTION ON A DISPLAY OF THE WT FOR SELECTION OF A SUBSTITUTE ID TO REPLACE THE PID WITHIN THE L WHEN THE S MATCHES ONE OF THE OTHER RS

341 — FLAG A SPECIFIC ID UNACCOUNTED FOR IN THE L THAT SHOULD BE ASSOCIATED WITH THE ITEM FOR INSPECTION DURING THE INTERVENTION

331 — ITERATE BACK TO 310 FOR A NEXT ITEM ASSOCIATED WITH A NEW ID FROM THE L OF ID WHEN THE S MATCHES TO THE IIS UNTIL NO MORE OF THE ID ARE PRESENT IN THE LIST

332 — ASSIGN A PRICE TO THE PID IN THE L BASED ON THE RW

PRODUCE IDENTIFICATION, WEIGHT, AND CHECKOUT VERIFICATION PROCESSING

CROSS-REFERENCE TO RELATED APPLICATION

This application is a continuation of U.S. patent application Ser. No. 16/586,320, filed Sep. 27, 2019, which application and publication is incorporated herein by reference in its entirety.

BACKGROUND

Grocery shopping has advanced significantly in recent years. Consumers can now scan their grocery items with their own mobile phones and/or with store-provided mobile scanning devices. Barcoded items make scanning and item identification quick and efficient. However, there are a several complications for both the grocery stores and the consumers when it comes to items sold by weight, such as produce.

Produce is either sold by quantity or by weight and often there are no barcodes on the produce itself; rather, the consumer may be required to scan a barcode on produce shelving, on the produce itself, or perform a search to select the proper produce item being purchased. Another complication is that some produce may be organic and significantly more expensive than a same type of produce that is non-organic, such that misidentification by the consumer can be costly to the retailer or to the consumer if the consumer scans a shelf code for organic produce when the consumer actually took non-organic produce. It may also be that the consumer intentionally scans a less expensive produce barcode to steal from the retailer.

In some cases, produce is not even identified while the consumer is shopping; rather, when the consumer checkouts, the items are analyzed and a list for selection is presented to the consumer to identify each consumer-selected produce in the transaction. After the consumer identifies a specific produce selection additional image verification takes place to guard against theft (when consumers intentionally mis-identify a more expensive item or has placed a non-produce item on a weigh scale and selected a produce item). Some solutions offer self-weighing stations, where the items are again selected from a list, weighed, and barcodes are displayed or printed for the consumer to scan using their mobile device or a specialized portable shopping device.

Additionally, because of the inefficiencies associated with produce identification, verification, and handling within self-shopping systems, retailers are unable to effectively sell discounted produce that may be nearing expiration for which the retailers are willing to take less than a listed retail price. In most cases, the aging produce is mixed in with fresh produce and is never selected by the consumer; resulting in produce being thrown out as a complete loss to the retailer.

As a result, existing self-shopping systems inefficiently handle produce identification, verification, and checkout processes.

SUMMARY

In various embodiments, produce identification, weight, and checkout verification methods and a system are provided.

According to an aspect, a method for produce identification, weight, and checkout verification processing is presented. More particularly, an item placed on a weigh scale is identified from an image taken at a weigh terminal while the item is being weighed on the weigh scale. An image signature for the image is verified for a match to an item image signature associated with a particular item identifier appearing in a list of item identifiers associated with a transaction. A recorded weight for the item, as provided by the weigh scale, is associated with the particular item identifier in the list when verification is successful. The transaction is flagged for intervention during checkout when verification is unsuccessful.

BRIEF DESCRIPTION OF THE DRAWINGS

FIG. 3 is a diagram of a method for produce identification, weight, and checkout verification processing, according to an example embodiment.

DETAILED DESCRIPTION

Figure 1:
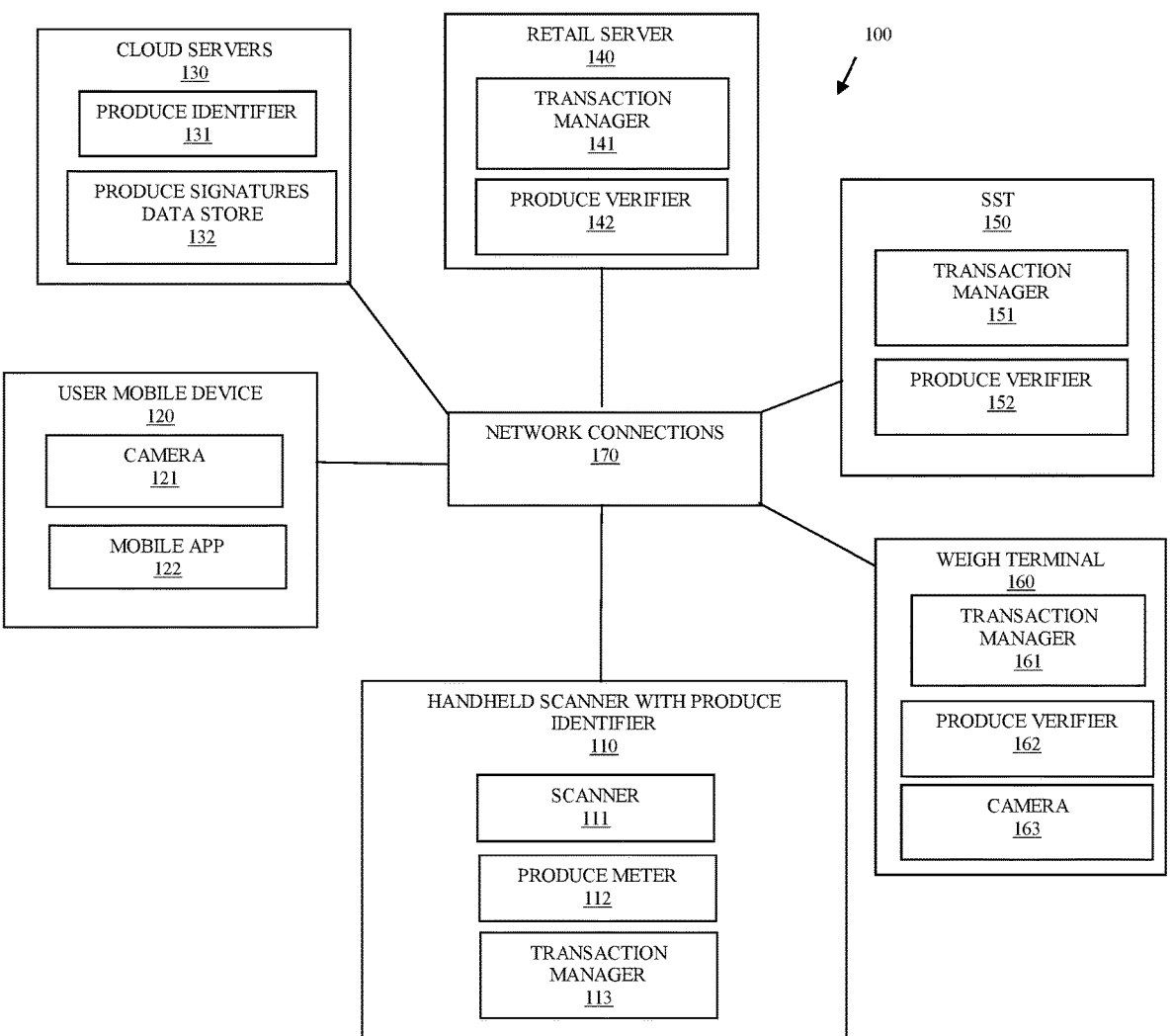
FIG. 1 is a diagram of a system for produce identification, weight, and checkout verification processing system, according to an example embodiment.

FIG. 1 is a diagram of a system 100 for produce identification, weight, and checkout verification within a self-shopping system. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of produce identification, weight, and checkout verification processing, presented herein and below.

As used herein and below, the terms "user," "consumer," "user," "shopper," and "customer" may be used interchangeably and synonymously. The terms refer to an individual that is performing self-shopping using a modified and enhanced self-shopping system as discussed herein and below.

As used here and below a "self-shopping system" or a "mobile-shopping system" is intended to mean that a customer/consumer shops and scans in the store aisles using either a personal smart phone (user mobile device 120), or a dedicated handheld shopping device (handheld scanner with produce identifier 110) that may be pick up from a kiosk within the store.

Enhancements or modifications are made to an existing mobile application utilized for self-shopping as mobile app 122. The enhancements include features to custom-correct color for each user mobile device 120, optimize the camera operating mode, and maintain a controlled camera distance for purposes of maximizing computer vision of the target produce that is being identified in the resulting image.

Enhancements are made to existing transaction managers 113, 141, 151, and 161 and produce verifiers 142, 152, and 162. These enhancements permit more efficient produce verification and checkout processes with respect to produce items and permit aging produce to be identified at discounted prices as an incentive to purchase such produce. Still further, verification and theft prevention are enhanced to handle produce items.

System 100 includes a plurality of processing devices and device types 110-160. The system 100 includes a handheld scanner with produce identifier 110, a user-mobile device 120, cloud servers 130, a retail server 140, a Self-Service Terminal (SST), and a weigh station or terminal 160. Each device 110-160 includes its own processors and non-transitory computer-readable media to execute executable instructions that cause the corresponding processors on the corresponding devices 110-160 to perform the processing associated with transaction manager 113, mobile application (app) 122, produce identifier 131, transaction manager 141, produce verifier 142, transaction manager 151, produce verifier 152, transaction manager 161, and produce verifier 162.

Figure 2:
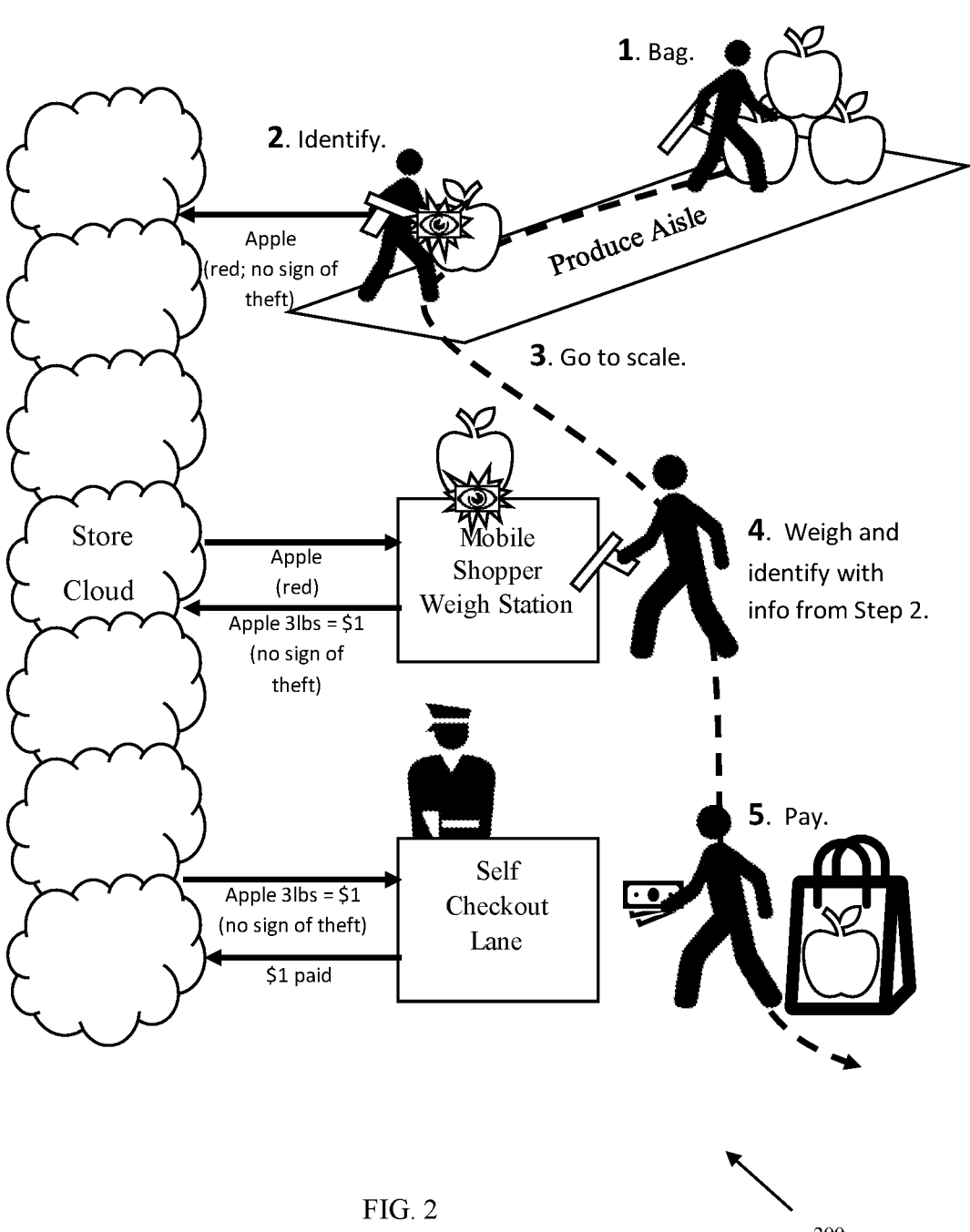
FIG. 2 is a diagram of a self-shopping system, according to an example embodiment.

FIG. 2 illustrates a high-level overview of the processing associated with a self-shopping system 200 utilizing components associated with system 100.

It is noted that both mobile device 120 and handheld scanner with produce identifier 110 do not have to both be present within system 100 although this may be the case in some embodiments. In those embodiments offering the handheld scanner with produce identifier 110, the device 110 may be picked up upon entering the store from a kiosk that distributes the devices 110.

Conventionally, produce is generally not identified within the aisles of the store as the consumer shops with device 120 or 110; rather, identification is done when the consumer weighs the items or checks out at a terminal. At that point in time, the produce is analyzed through image analysis and a list of produce items is presented to the customer for selection and identification of the produce item. In some instances, where in-aisle identification is available, the customer still must select the produce item from a list of available produce items, but such identification lacks in synergy with the checkout and weigh processes. These conventional issues are alleviated with system 100.

Using system 200 for context of system 100, processing proceeds as follows. In step 1, the shopper bags produce items in the aisle of the store. The produce item is then identified in a number of manners. First, either mobile device 120 or handheld scanner with produce identifier device 110 (hereinafter just "specialized shopping device 110") are used to capture a color, texture, or shape image of the produce being purchased at step 2. In the case of mobile device 120, mobile app 122 may change the camera settings from auto-exposure mode with illumination turned off to white illumination with fixed exposure and fixed macro focus. Mobile app 122 also ensures an optimal distance is achieved for the image sample of the produce item and may perform color corrections on the resulting image. In the case of specialized shopping device 110, a specialized spot color meter is activated to take the sample image and the specialized shopping device 110 is pressed against the produce item (there is a small aperture that ensures the proper distance between the produce item and the spot color meter (shown as produce meter 112 in FIG. 1)). It is noted that the specialized shopping device 110 also includes a scanner 111 for item barcode scanning of non-produce items.

The sample image from either the camera 121 of the mobile device 120 or produce meter 112 is then processed by mobile app 122 or transaction manager 113 to generate a color, texture, and/or shape signature for the produce item. This image-based signature for the produce item is provided over a network connection 170 to produce identifier 131. Produce identifier 131 searches produce signature data store 132 for a match or a close match on the produce signature and returns a single produce identifier or a list of substantially close produce identifiers to transaction manager 141 of retailer server 140 and/or directly to mobile app 122 or transaction manager 113 (using network connections 170). A user-facing interface of mobile app 122 or transaction manager 113 then displays an image of the produce item identifier or a list of potential produce item identifiers for selection by the shopper. After selection, the produce identifier and the image signature for the produce item are associated with the shopping cart of the shopper.

In another case of in-aisle produce identification at step 2 of FIG. 2, the camera 121 of the user device 120 may be used to scan a produce shelf barcode and/or scan a barcode placed on the produce itself. The produce identifier from the scanned barcode is sent to transaction manager 140 over network connection 170 from mobile app 122 or transaction manager 113. Previous image signatures known for the produce item may then be associated with the produce identifier as discussed above.

At step 2, the image signature may be used to identify aging produce and/or the identified produce item may be known to transaction manager 141 to include some discounted produce items that are aging on a produce shelf associated with the identified produce item. This can be done through tables or databases managed by retailer on retailer server 140 and/or through cloud server 130. In such cases, transaction manager 141 or produce identifier 131 provides an alert and details on the discounted produce item of availability of a discounted produce item to mobile app 122 and/or transaction manager 113. The user-facing interface of app 122 and/or transaction manager 113 then alerts the shopper to either a discounted price on the user-scanned produce item based on image signature or availability of discounted price on certain other produce items available on the produce item display/shelf. This provides the retailer an opportunity to move produce that would otherwise be thrown in the trash and go unsold, and this provides the shopper an opportunity to obtain a savings on the produce item that the shopper had planned to purchase anyway. Moreover, this processing occurs while the shopper is in the aisle and selecting the produce and not when the shopper is checking out with their items, which means the shopper is more likely to purchase discounted produce items.

Step 2 may also identify discrepancies in produce identification based on shopper actions of scanning incorrect barcodes of produce items from item shelving or from produce items, and other actions. These discrepancies are saved for handling at step 5.

At step 3 in FIG. 2, the shopper proceeds to distributed mobile weigh stations 160 to weight the produce item, which has already been identified and which is already associated with the shopping cart from step 2.

At step 4, transaction manager 161 scans a barcode displayed on a display screen of mobile device 120 that uniquely identifies the shopping cart of the user (provided by mobile app 122 and issued by transaction manager 141 at the start of the self-shopping transaction). Alternatively, transaction manager 113 makes connection over network connections 170 directly to weigh terminal 160 and communicates a shopping cart identifier (again generated by transaction manager 141 and communicated at the start of the transaction to transaction manager 113). It may also be that mobile app 122 permits a barcode or identifier associated with or displayed on weigh terminal 160 to be captured by camera 121 and a shopping cart identifier is provided over network connections 170 to transaction manager 161, or scanner 111 captures the weight terminal identifier and provides the shopping cart identifier to terminal 160 over network connections 170.

Once this is done, transaction manger 161 has item identifiers in the shopping cart for the shopper. The shopper may select any produce item requiring weighing and place on the weigh scale of terminal 160. A camera 163 of terminal 160 captures the image and/or captures specialized image of the produce item as discussed above. The produce item identifiers are acquired from the shopping list, and the produce item is quickly identified by produce verifier 162 or produce verifier 142 over network connection 170 and the produce item is verified or not verified (such item placed on weigh scale is not present in the shopping cart). Identification can be achieved through generation of the image signature of the produce item and comparing such image signature with the image signature recorded and linked in the shopping cart, or through using a generated image signature and comparing the produce identifier associated with that newly generated image signature against the produce item identifiers and their known image signatures. Produce verifier 162 or produce verifier 142 can generate the image signature for the produce item placed on the weigh scale of terminal 160.

The proper weight and price for the produce item is recorded through interaction between transaction manager 161 and transaction manager 141 over a network connection 170. A displayed list of remaining produce items requiring weights are displayed on a display of terminal 160 and/or display of mobile device 120 (through interaction between transaction manager 161 and mobile app 122 over a network connection 170 or display of specialized shopping device 110 through interaction between transaction manager 161 and transaction manager 113 over network connection 170.

If any discrepancy is noted during produce weighing, those discrepancies are noted and linked to the shopping cart by transaction manager 141. Discrepancy may be based on shopper-misidentification of the produce type or shopper item substitution by attempting to have a non-produce item pass as a produce item. Purchase verifier 162 or 142 quickly and efficiently identify and verify produce items because the produce items are already identified from step 2 and because an image signature is associated with the produce items or a known image signature is linked to a produce identifier associated with each produce item.

The user-facing interface of mobile app 122, transaction manager 113, or transaction manager 161 may instruct the shopper after connection shopping cart identification, to place any of the recorded produces items available in the shopping cart to place any item in any order on the weigh scale of terminal 160. The shopper is not required to follow a predefined order of verifying their produce and recording their weights and prices for the above-noted process in step 4.

Also, identification of aging produce may be first identified or confirmed through produce verifier 162 or 142 and/or transaction manager 161 or 141.

At step 5, the shopper proceeds to pay for the items in the shopping cart. This can be done through mobile app 122 and/or through payment terminals or SSTs 150. It is noted that in some embodiments, SSTs 150 also include weigh plates such that the processing discussed above for the weigh terminal 160 in step 4 may be processed at SST 150 through transaction manager 151 and produce verifier 152. It may also be that SST 150 is merely a payment terminal. The process of identifying the shopping cart to the SST 150 and obtaining the shopping cart item details may also be done in the manners discussed above with step 4 and weigh terminal 160.

Also, at step 5, if there were any discrepancies noted at steps 2 and 4, transaction manager 151 or mobile app 122 blocks payment for the shopping cart and sends alerts to store personnel or store systems for immediate intervention. If at step 5, the produce is being weighed and verified then produce verifier 152 may generate the discrepancies based on similar processing discussed above at step 4 for discrepancy identification.

As is apparent, there are many variations that can be achieved. For example, produce identifier 131 and produce signatures data store 132 may reside on retail server 140. The process of generating image signatures may be off-loaded from device 120, specialized shopping device 110, weigh terminal 160, and/or SST 150 to produce verifier 142 of retail server 141.

In an embodiment, mobile device 120 is a phone, a tablet, or a wearable processing device.

These and other embodiments are now discussed with reference to the FIGS. 3-4.

FIG. 3 is a diagram of a method 300 for produce identification, weight, and checkout verification processing, according to an example embodiment. The software module(s) that implements the method 300 is referred to as a "weigh terminal item verifier." The weigh terminal item verifier is implemented as executable instructions programmed and residing within memory and/or a non-transitory computer-readable (processor-readable) storage medium and executed by one or more processors of a device. The processor(s) of the device that executes the weigh terminal item verifier are specifically configured and programmed to process the weigh terminal item verifier. The weigh terminal item verifier may have access to one or more network connections during its processing. The network connections can be wired, wireless, or a combination of wired and wireless.

In an embodiment, the device that executes the weigh terminal item verifier is the weigh terminal 160.

In an embodiment, the device that executes the weigh terminal item verifier is user SST 150 having a weigh scale and operating as a combined checkout terminal and a weigh terminal.

In an embodiment, the weigh terminal item verifier is transaction manager 161 and/or the produce identifier 162.

At 310, the weigh terminal item verifier identifies an item placed on a weigh scale of a weigh terminal (such as weigh terminal 160) from an image taken at the weigh terminal while the item is being weighed on the weigh scale.

In an embodiment, at 311, the weigh terminal item verifier obtains a transaction identifier for the transaction from a mobile device (such as through mobile application 122 of mobile device 120) and obtain a transaction list comprising the list of item identifiers (discussed at 320 below) and other item identifiers using the transaction identifier.

In an embodiment of 311 and at 312, the weigh terminal item verifier derives the list of identifiers from the transaction list of item identifiers based on an item type associated with the item identifiers that indicate the item identifiers require weights for the transaction.

At 320, the weigh terminal item verifier verifies an image signature for the image matches an item image signature for a particular item identifier appearing in the list of item identifiers with a transaction.

In an embodiment of 312 and 320, at 321, the weigh terminal item verifier generates the image signature from the image taken at the weigh terminal.

In an embodiment of 321 and at 322, the weigh terminal item verifier obtains registered item image signatures for the list based on the item identifiers present in the list of identifiers.

In an embodiment of 322 and at 323, the weigh terminal item verifier determines whether the image signature matches any of the registered item image signatures.

In an embodiment of 323 and at 324, the weigh terminal item verifier attempts to match the image signature to other registered item image signatures associated with item identifiers not present in the list when the image signature does not match to any of the registered item signatures associated with the list.

In an embodiment of 324 and at 325, the weigh terminal item verifier presents a correction on a display of the weigh terminal for selection of a substitute item identifier to replace the particular item identifier when the image signature matches one of the other registered item image signatures.

At 330, the weigh terminal item verifier associated a recorded weight for the item provided by the weigh scale with the particular item identifier in the list when 320 matches the image signature to the item image signature.

In an embodiment, at 331, the weigh terminal item verifier iterates back to 310 for a next item associated with a new item identifier from the list of item identifiers when the image signature matches to the item image signature until there are no more of the item identifiers present in the list. The next item in the list can be any remaining item in the list that a shopper places on the weigh scale. As soon as the next item from the list is placed on the weigh scale, the weigh terminal item verifier iterates back to 310.

In an embodiment, at 332, the weigh terminal item verifier assigns a price to the particular item identifier in the list based on the recorded weight.

At 340, the weigh terminal item verifier flags the transaction for intervention during checkout when the signature fails to match based on 320.

In an embodiment, at 341, the weigh terminal item verifier flags a specific item identifier unaccounted for in the list that should be associated with the item for inspection during the intervention.

Figure 4:
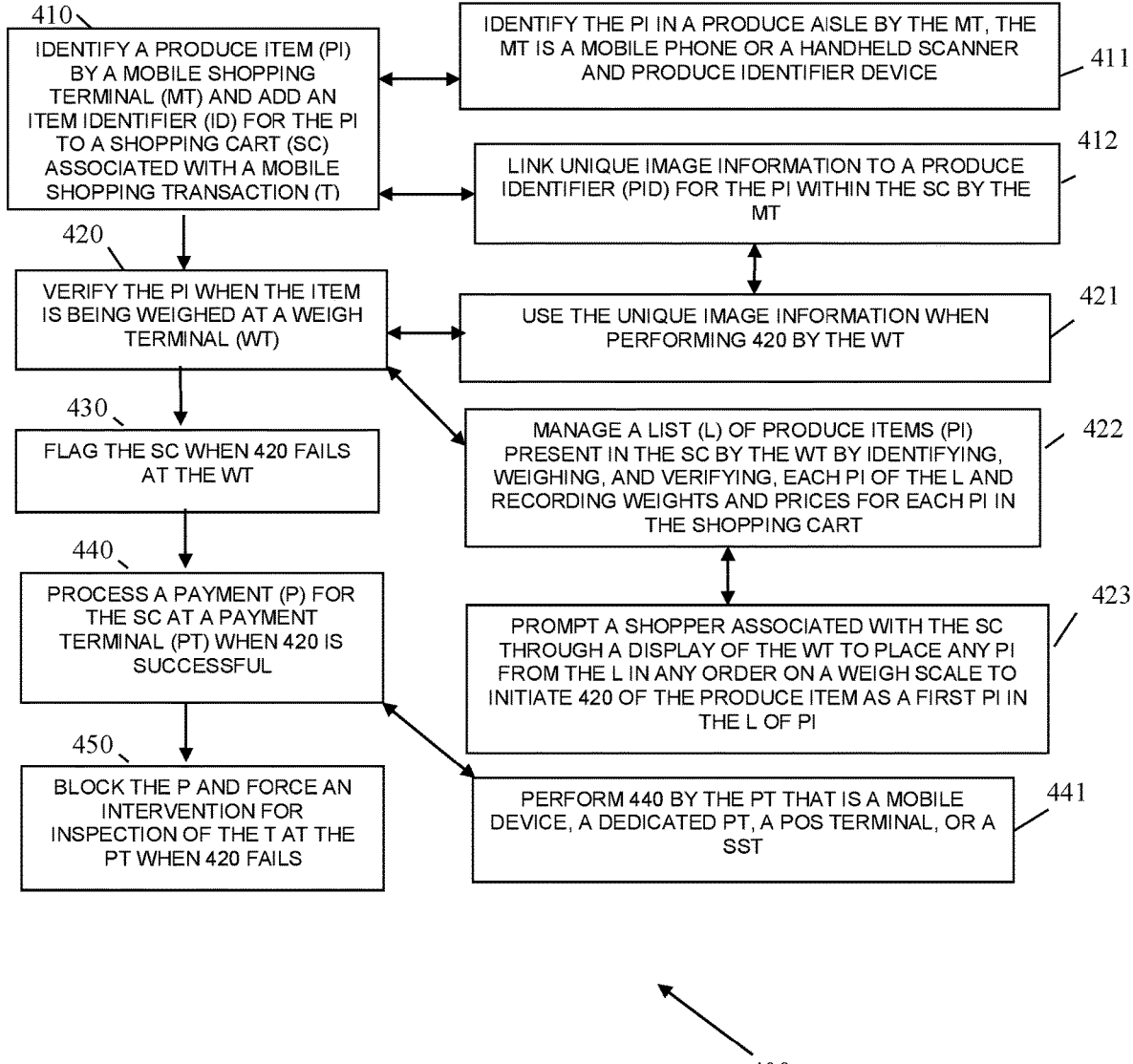
FIG. 4 is a diagram of another method for produce identification, weight, and checkout verification processing, according to an example embodiment.

FIG. 4 is a diagram of another method 400 for produce identification, weight, and checkout verification processing, according to an example embodiment. The software module (s) that implements the method 400 is referred to as a "self-shopping produce identifier and verifier." The self-shopping produce identifier and verifier is implemented as executable instructions programmed and residing within memory and/or a non-transitory computer-readable (processor-readable) storage medium and executed by one or more processors of one or more devices. The processors that execute the self-shopping produce identifier and verifier are specifically configured and programmed to process self-shopping produce identifier and verifier. The self-shopping produce identifier and verifier may have access to one or more network connections during its processing. The network connections can be wired, wireless, or a combination of wired and wireless.

In an embodiment, multiple devices execute the self-shopping produce identifier and verifier on all or some combination of handheld scanner with produce identifier 110, mobile device 120, cloud servers 130, retail server 140, SST 150, and/or weigh terminal 160.

In an embodiment, the self-shopping produce identifier and verifier performs all or some combination of the processing discussed above with respect to the FIGS. 1-3.

In an embodiment, the self-shopping produce identifier and verifier is all or some combination of: transaction manager 113, mobile app 122, produce identifier 131, transaction manager 141 produce verifier 142, transaction manager 151, produce verifier 152, transaction manager 161, produce verifier 162, and/or the method 300.

At 410, the self-shopping produce identifier and verifier identifies a produce item and adds an item identifier for the produce identifier to a shopping cart of a shopper associated with a mobile shopping transaction. 410 is processed on a mobile shopping terminal, such as mobile device 120 or mobile scanner with produce identifier device 110.

In an embodiment, at 411, the self-shopping produce identifier and verifier identifies the produce item in a produce aisle. Again, this is performed by mobile phone or device 120 or the specialized handheld scanner and produce identifier device 110.

In an embodiment, at 412, the self-shopping produce identifier and verifier links unique image information to a produce identifier for the produce item within the shopping cart. This is performed by the mobile shopping terminal. In an embodiment, the unique image information is the image signatures, color, texture, shape metrics discussed above.

At 420, the self-shopping produce identifier and verifier verifies the produce item when the produce item is being weighed at a weigh terminal. In an embodiment, weigh terminal is weight terminal 160. Verification at 420 is performed on the weight terminal.

In an embodiment of 412 and 420, at 421, the self-shopping produce identifier and verifier uses the unique image information obtained with the shopping cart when performing the verification at 420. This processing is again performed on the weigh terminal.

In an embodiment, at 422, the self-shopping produce identifier and verifier (processing on or from weigh terminal) manages a list of produce items present in the shopping cart by identifying, weighing, and verifying each produce item of the list and recording weights and prices for each produce item in the shopping cart.

In an embodiment of 422 and at 423, the self-shopping produce identifier and verifier prompts a shopper associated with the shopping cart through a display of the weigh terminal to place any produce item from the list in any order on a weigh scale to initiate verification processing at 420 as a first produce item in the list of produce items.

At 430, the self-shopping produce identifier and verifier flags the shopping cart when 420 fails to verify the produce item. This flagging occurs on or from the weigh terminal.

At 440, the self-shopping produce identifier and verifier processes a payment for the shopping cart on or at a payment terminal when 420 and verification was successful for each produce item in a list of produce items or for a single produce item associated with the shopping cart.

In an embodiment, at 441, the payment processing of 440 is performed by the payment terminal that is a mobile device 120, a dedicated payment terminal, a POS terminal, or an SST 150.

At 450, the self-shopping produce identifier and verifier blocks the payment and forces an intervention for inspection of the transaction at the payment terminal when 420 fails and/or when the shopping cart was flagged at 430.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

obtaining, from a camera associated with a mobile device, an image of an item placed on a weigh scale;

wherein obtaining comprises:

changing, by a mobile application associated with the mobile device, camera settings for the camera to a particular setting associated with white illumination with fixed exposure and fixed macro focus to optimize a camera operating mode;

performing, by the mobile application, custom color correction to optimize image processing for specific characteristics of the mobile device;

maintaining, by the mobile application, a controlled distance of the camera from the item to enable improved computer vision of the item;

generating, by the mobile application or a transaction manager of a self-service terminal, an image signature for the image based on a color, a texture, and a shape of the item; and matching the image signature from a plurality of image signatures associated with a plurality of known items to a known item, wherein matching comprises:

searching a produce signature data store that comprises the plurality of image signatures using the image signature for the item;

returning a single produce identifier for the item based on the searching interacting between the transaction manager and a produce identifier of a retailer server to associate or record a proper weight and a price for the item based on a weight reported by the weigh scale for the item; and identifying an aging produce item based on the image signature;

providing, via a user interface of the mobile application or the transaction manager, an alert and details regarding a discounted produce item associated with the aging produce item based on the image signature and based on a discounted price for the aging produce item; and exchanging produce identification data for the item, weight data for the item, and the discounted price for the item between the mobile application and the transaction manager to coordinate data flow among the mobile device, the weigh scale, the self-service terminal, and the retailer server to enable transaction processing for the item.

2. The method of claim 1, wherein matching further comprises:

receiving an item identifier for the item from the transaction manager; and processing a transaction using a known item identifier for the item, the weight, and other item identifiers for other items associated with the transaction.

3. The method of claim 2, wherein receiving the item identifier comprises correcting the item identifier with the known item identifier when the item identifier is not the known item identifier for the known item.

4. The method of claim 3, wherein correcting comprises sending a known item image for the known item identifier to a display of the weigh scale to present on the display as a correction to the item identifier.

* * * * *